(12) United States Patent
Choi

(10) Patent No.: US 7,307,573 B2
(45) Date of Patent: Dec. 11, 2007

(54) REMOTE CONTROL SYSTEM AND INFORMATION PROCESS SYSTEM

(75) Inventor: Un-Ha Choi, Kyungsangbuk-do (KR)

(73) Assignee: Ohsung Electronics Co., Ltd., Kyungsangbuk-do (KR)

( * ) Notice: Subject to any disclaimer, the term of this patent is extended or adjusted under 35 U.S.C. 154(b) by 225 days.

(21) Appl. No.: 11/101,709

(22) Filed: Apr. 8, 2005

(65) Prior Publication Data

US 2006/0044175 A1    Mar. 2, 2006

(30) Foreign Application Priority Data

Aug. 31, 2004    (KR) .................... 10-2004-0068935

(51) Int. Cl.
*H03K 17/94* (2006.01)

(52) U.S. Cl. .................. 341/175; 345/173; 703/13

(58) Field of Classification Search ............... 341/175, 341/176; 345/173; 703/13
See application file for complete search history.

(56) References Cited

U.S. PATENT DOCUMENTS

| | | | |
|---|---|---|---|
| 6,208,341 B1 * | 3/2001 | van Ee et al. ............... 715/716 |
| 6,741,684 B2 * | 5/2004 | Kaars .................... 379/110.01 |
| 6,937,972 B1 * | 8/2005 | Van Ee ........................ 703/20 |
| 2005/0231414 A1 * | 10/2005 | Chu et al. .................... 341/175 |

* cited by examiner

*Primary Examiner*—Timothy Edwards, Jr.
(74) *Attorney, Agent, or Firm*—Apex Juris, pllc; Tracy M Heims

(57) ABSTRACT

A remote control system includes a display device providing a graphic user interface and a touch screen for inputting a control command. A macro editing is realized through the graphic user interface and the touch screen and steps provided for the macro are arranged in rows and columns.

8 Claims, 2 Drawing Sheets

| Run | Delay | Sound | Text | Jump |
|---|---|---|---|---|
| TV on | | Sound A | Text a | |
| | Delay 3 Seconds | | | |
| Speaker on | | Sound B | | TV |
| Channel 18 | | | Text b | |

| Run | Delay | Sound | Text | Jump |
|---|---|---|---|---|
| TV on | | Sound A | Text a | |
| | Delay 3 Seconds | | | |
| Speaker on | | Sound B | | TV |
| Channel 18 | | | Text b | |
| | | | | |

REMOTE CONTROL SYSTEM AND INFORMATION PROCESS SYSTEM

BACKGROUND OF THE INVENTION

1. Field of the Invention

The present invention relates to a remote control system and an information process system, and more particularly, to a remote control system and an information process system, which can easily edit macro so that a variety of functions can be consecutively realized in a remote control system remotely controlling a plurality of electronic devices.

2. Description of the Related Art

Generally, there are two types of remote control systems are well known. One is a self-update type remote control system that is designed to control a variety of electric devices by receiving and storing infrared signals. The other one is a pre-memory type remote control system that is designed to store key codes of electronic devices and manufacturer thereof so that a user identifies and selects a manufacturer and a model name to remotely control the devices.

In recent years, a remote control system has been designed to have an LCD screen formed of a touch panel and a plurality of hard buttons and to transmit infrared and RF signal, providing a graphic user interface (GUI) through the LCD screen.

That is, the user can control the electronic devices using the GUI displayed on the touch panel and can edit the GUI according to his/her liking.

In addition, it is possible to emulate through a computer and to edit and program the constitution and operation state of the remote control system on the computer.

As such a remote control system, "Pronto" of Phillips Company is widely known.

This remote control system is designed to edit macro that is a stream representing commands of specific steps.

That is, when the user generates the macro by inputting steps and inputs specific buttons relating to the macro, the remote control system operates the steps in regular sequence.

For example, when the user pushes a macro-setting button, the remote control system transmits infrared or RF signal so that a series of steps (i.e., TV ON, speaker ON, volume 30 (adjust of volume to a level 30), channel 18 (change the TV channel to the No. 18 channel) can be processed.

Accordingly, by push the key one time, a variety of operations can be realized.

Such a macro function can be edited by GUI of the remote control system and stored in the same. The edited macro may be uploaded to the computer. Alternatively, the macro function can be edited through a computer and then downloaded to the remote control system.

The edited macro function is stored in the memory so as to operate the edited functions when the user pushes the button relating to the macro function.

However, such a prior remote control system cannot provide easy macro editing function to the user.

For example; the prior GUI used for the macro editing vertically arranges the steps of the macro so that user can edit the desire functions. There are 255 steps the user can edit.

That is, as shown FIG. 1, the functions the user wants are vertically arranged in time sequence.

However, since the screen size that can display the edited state is limited, when the macro is edited to be complicated, it is very difficult for the user to identify if the macro is correctly edited.

SUMMARY OF THE INVENTION

Accordingly, the present invention is directed to a remote control system and an information processing system that substantially obviate one or more problems due to limitations and disadvantages of the related art.

An object of the present invention is to provide a remote control system and an information processing system, which can allow a user to easily edit the macro function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a remote control system includes a display device providing a graphic user interface; and a touch screen for inputting a control command, wherein a macro editing is realized through the graphic user interface and the touch screen; and steps provided for the macro are arranged in rows and columns.

In another aspect of the present invention, there is provided an information processing system comprising a computer; and a remote control system remotely controlling a variety of electric device, wherein the computer has a macro editing function for the remote control system; macro edited in the computer is downloaded to the remoter control device; and the computer allows steps provided for the macro to be arranged in rows and columns.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
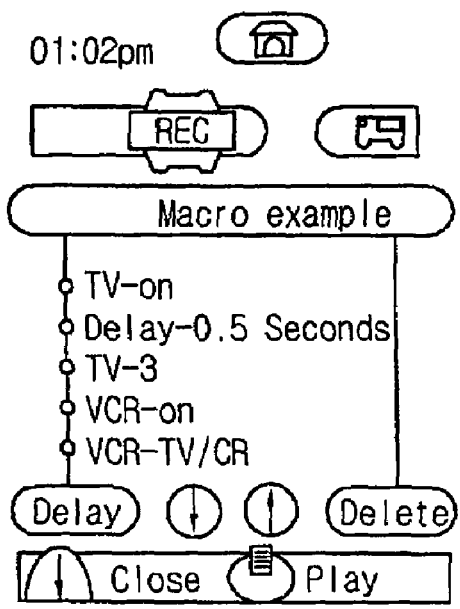
FIG. 1 is a schematic view illustrating a macro editing example in a prior remote control system.
Figure 2:
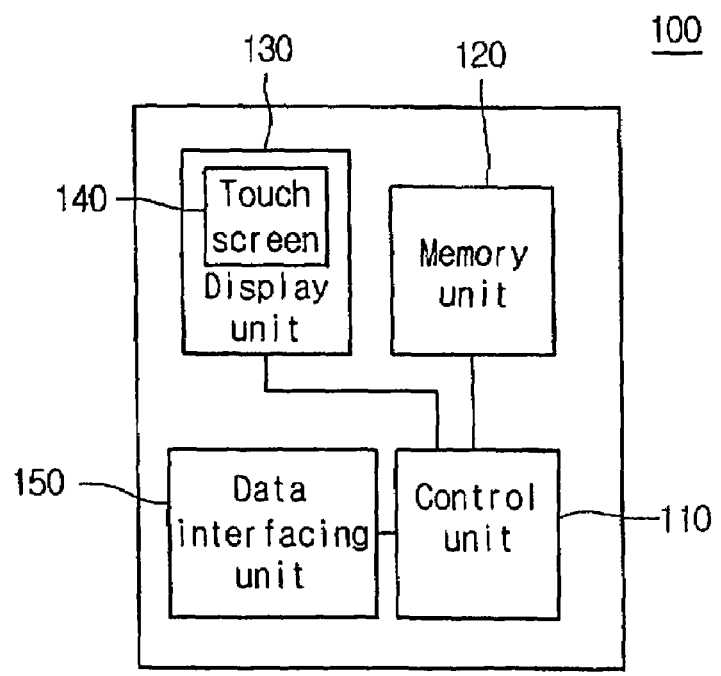
FIG. 2 is a view of a remote control system according to an embodiment of the present invention.

FIG. 2 shows a remote control system according to an embodiment of the present invention;

The inventive remote control system includes a display device 130 displaying a GUI. The display device 130 has a touch screen 140 through which the user can input user's control commands. The display device 130 may be formed of a liquid crystal display (LCD) panel and the touch screen 140 is formed of a well-know panel.

Meanwhile, the remote control system 100 further includes a plurality of hard buttons for the key input.

A memory unit 120 having a ROM, a RAM and a variety of buffers is provided to store control codes and a variety of programs that are used for controlling electric devices.

A data transmission unit 150 is provided to receiving signals inputted from an outer side, thereby controlling the electric devices according to the user's control commands.

The control signals may be infrared signals or RF signals. The signals inputted from the outer side may be infrared signals or RF signals transmitted other remote control systems or may be information transmitted from a computer.

A control unit 110 is provided to control the operation of the remote control system 100 to perform a specific function by extracting data stored in the memory unit 120 according to a user's control command.

The remote control system 100 of the present invention is directed to a universal remote control that can control a variety of electric device regardless of a type of electric device, a manufacturer, a model No.

Such a universal remote control can be realized by storing current control codes (infrared or RF) in the memory unit. The user properly selects a control code and properly programs the transmission of the control code.

Accordingly, the universal remote controller can be used to control a variety of electric devices such as TV, VCR, lighting, security system, and the like regardless of the manufacture.

The remote control system 100 has a program that allows a user to edit the macro function using the touch screen 140 or the hard buttons.

Alternatively, the macro function may be edited by an editor of a computer and is then downloaded to the remote control system 100 through a wire/wireless communication.

The edited macro function can be stored in conjunction with a GUI button on the touch screen 140 or a specific hard button. By click the GUI button or pushing the hard button, the macro function is performed.

Figures 3, 4:
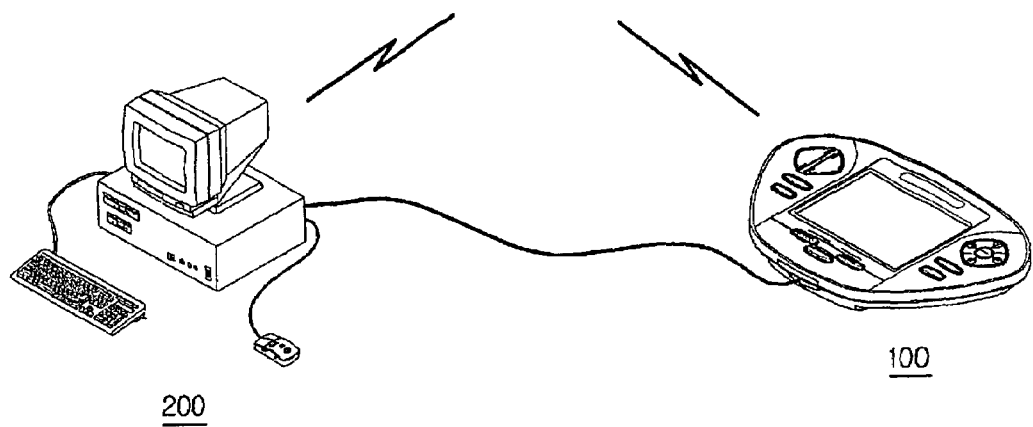
FIG. 3 is a view illustrating a macro editing example in a remote control system of the present invention.
FIG. 4 is a schematic view of an information processing system according to an embodiment of the present invention.

FIG. 3 illustrates a macro editing example in a remote control system of the present invention.

In the prior remote control system, the steps of the macro are vertically displayed on the screen in time sequence.

However, in the present invention, the steps of the macro can be edited through an editing screen in which they are arranged in rows and columns.

In FIG. 3, a "run" means a function operated by transmitting infrared or RF signals and a "delay" means that the macro starts again after the macro operation is stopped by a predetermined time. That is, the "delay" function may be used for a case where it should wait until the TV normally operates after the TV is turned ON.

Meanwhile, a "sound" and a "letter" may be provided for the GUI of the remote control system. In FIG. 3, when a TV-On signal is applied, a "sound A" preset by the user and a letter "a" are display in the remote control system.

A "jump" provides a function for changing a screen display on the display device to a specific screen during the running of the macro. This allows the user to add a specific function manually or to intervene the running of the macro.

As shown in FIG. 3, the remote control system provides the GUI in which the steps are arranged in rows and columns so as for the user to easily edit the macro.

The steps in the columns are arranged in time sequence and the steps in the rows are arranged in time sequence or randomly.

Particularly, the steps in the rows can be conveniently used in the case where the time sequence is not required.

Meanwhile, the steps arranged in the rows and columns can be all or partly displayed on a single screen. When the steps are partly displayed, the user edits the macro while moving the screen vertically horizontally. This function can be provided as the GUI.

A variety of selection keys or function keys that are used for the macro editing can be provided as the GUI buttons so that user can easily edit the macro.

FIG. 4 shows an information processing system according to an embodiment of the present invention.

The information processing system includes a computer 200 and a remote control system 100 data-interfacing with the computer 200.

The computer 200 includes an editor used for editing the macro of the remote control system 100. The macro edited in the computer 200 may be downloaded to the remote control system 100 through wire/wireless communication.

The computer 200 provides the GUI in which the steps the user wants can be arranged in the rows and columns. The edited macro may be stored in the memory unit of the remote control system 100.

The user further edits the macro stored in the remote control system 100. At this point, as shown in FIG. 3, the macro is provided as the GUI in which the steps are arranged in the rows and columns.

According to the above-described remote control system and information processing system of the present invention, the user can easily edit the macro using the effective GUI.

That is, the GUI in which the steps are arranged in the rows and columns can allow the user to more easily edit the macro.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A remote control system comprising:
    a display device providing a graphic user interface; and
    a touch screen for inputting a control command,
        wherein a macro editing is realized through the graphic user interface and the touch screen; and
    steps provided for the macro are arranged in rows and columns.

2. The remote control system according to claim 1, wherein the steps in the columns are arranged in time sequence.

3. The remote control system according to claim 1, wherein the steps in the rows are arranged in the time sequence.

4. The remote control system according to claim 1, wherein the steps in the rows are randomly arranged.

5. An information processing system comprising:

a computer; and a remote control system remotely controlling a variety of electric device, wherein the computer has a macro editing function for the remote control system;

macro edited in the computer is downloaded to the remoter control device; and the computer allows steps provided for the macro to be arranged in rows and columns.

6. The remote control system according to claim 5, wherein the steps in the columns are arranged in time sequence.

7. The remote control system according to claim 5, wherein the steps in the rows are arranged in the time sequence.

8. The remote control system according to claim 5, wherein the steps in the rows are randomly arranged.

* * * * *